United States Patent Office 3,623,900
Patented Nov. 30, 1971

3,623,900
METHOD OF FACING TIRES WITH COLORED SIDEWALLS
Nelson Jonnes, Stillwater, and Robert J. Huberty, Mendota Heights Township, Dakota County, Minn., assignors to Minnesota Mining and Manufacturing Company, St. Paul, Minn.
No Drawing. Filed Jan. 10, 1969, Ser. No. 790,468
Int. Cl. B44c 1/08; B44d 1/092
U.S. Cl. 117—9                                          5 Claims

ABSTRACT OF THE DISCLOSURE

A method for forming tire sidewall facings by applying a liquid coating material in a recess formed in the tire and allowing the coating material to cure. The coating material comprises an epoxy resin and curing agent reactive with an epoxy resin, which react together to form a durable elastomeric material having high adhesion to vulcanized tire rubber.

BACKGROUND OF THE INVENTION

The colored sidewalls on automobile tires have until the present time almost universally been made in a tire factory. In the conventional procedure, a layer of elastomeric material colored other than black, usually white, is included as an intermediate layer in the several layers of uncured black rubber that are to form the tire body. When these layers of rubber are formed into a tire shape and vulcanized, the colored layer becomes a substratum in the tire sidweall. Subsequently, the black rubber that covers the colored layer is abraded away to form a neatly defined color sidewall surface.

This factory manufacture of tires with colored sidewalls is an expensive procedure, and, in addition, it limits the number of colors in which tires can be supplied. The large inventory of tires of different colors that would have to be maintained in the factory and at the place of retail sale in order to properly market a variety of tires with different colored sidewalls would be overwhelming. Thus, though there has been a long-standing desire by many automobile stylists and car owners for tires with sidewalls having a color that matches or complements the color of an automobile on which the tires are to be used, there has been no practical way of fulfilling this desire.

SUMMARY OF THE INVENTION

The present invention provides materials and methods for simply and inexpensively forming tire sidewall facings either at the factory, at the place of retail sale, or at home by the car owner. According to the methods of this invention, a recess is formed in the sidewall of finished tires, preferably by molding it during manufacture of the tires. Subsequently, a liquid tire-sidewall coating material that cures to an elastomeric material having high adhesion to vulcanized tire rubber, is deposited in the recess in a thin layer. The tire is then subjected to conditions sufficient to cure the layer of material, after which the tire is ready to be placed on a car.

Others have suggested similar methods in which a pigmented fluid rubber cement or rubber solution is applied in a recess in a tire; see, for example U.S. Pats. 1,741,997 and 2,821,487. But these suggestions have never led to satisfactory tires, principally because the materials suggested as the fluid rubber cement or rubber solution were inadequate to provide colored sidewall facings of the necessary adhesion to the rest of the vulcanized tire and durability. After a period of time a tire-sidewall facing applied according to the teachings of these prior suggestions cracked and delaminated from the tire.

By contrast, the liquid tire-sidewall coating material used in the present invention provides tire-sidewall facings that are generally as adherent to the rest of the tire and as long-lasting as tire-sidewall facings presently formed on tires in tire factories. The new coating materials are based on epoxy resins, and the excellent adhesion of the facings of this invention to vulcanized tire rubber is believed to arise from the fact that the oxirane group of the epoxy resin reacts to form polar hydroxyl groups that promote adhesion. Polyether polyamines of rather high molecular weight, and especially polyether polyamines based on recurring units of oxytetramethylene, are preferred curing agents, since they have been found to react with epoxy resins to provide a cured product that is elastomeric and exhibits the needed adhesion and durability. The preferred oxytetramethylene-based polyamines are generally water-insoluble polyether polyamines having primary amine terminal groups attached directly to each end of a polyether moiety that contains recurring groups, of which at least a majority consist of oxytetramethylene recurring units and at most a minority are recurring units of thioalkylene or another oxyalkylene having from 2 to 6 straight-chain carbon atoms. At least half of the primary amino terminal groups in this preferred polyether polyamine curing agent have the structure $-OC_4H_8NH_2$, and the polyether moiety contains less than about 3 weight-percent of secondary amino nitrogen atoms and less than about 0.3 weight-percent of tertiary amino nitrogen atoms.

By using the described method for coloring tire sidewalls, the inventory requirements for the tire factory and the retail tire seller are quite small. In the most simple marketing system, tire manufacturers make only one kind of tire of each grade and size sold, namely a tire made only from black rubber but formed with a recess appropriate to receive the liquid coating material of this invention. In addition to his inventory of these tires, a tire retailer maintains a stock of the liquid coating material and a variety of pigments, or he may maintain a stock of kits, each kit containing enough liquid material for a set of tires and each pigmented in one of a variety of colors. At the time of sale, a purchaser chooses the color of sidewall he desires and the service personnel of the retail tire store form a sidewall facing of that color in the tires purchased.

DETAILED DESCRIPTION

A wide variety of epoxy resins having an average of more than one oxirane group per molecule may be included in compositions of this invention for reaction with the curing agent. Both aliphatic epoxy resins and cycloaliphatic epoxy resins are useful, and monoepoxides may be mixed with polyepoxides, so long as in the final mixture there is an average of more than 1 and preferably more than 1.5 oxirane groups per molecule. Aliphatic epoxy resins generally provide a somewhat more fluid mix with the polyether polyamines, and produce a final cured sidewall facing that is superior in ultimate elongation properties. The use of an epoxy resin having a high content of aromatic or condensed ring structure generally gives a cured sidewall facing that is superior in load-bearing properties but somewhat lower in ultimate elongation. Generally, polyglycidyl ethers of bisphenol A are used, with the oxirane equivalent weight of the useful resins ranging from at least 170 to 1590.

The oxytetramethylene-based polyether polyamines preferred for use in this invention are of the type taught in a U.S. patent of Hubin et al., U.S. Pat. No. 3,436,359. Briefly, these polymers can be prepared by first forming a dicationically active polyether by reacting tetrahydrofuran and up to about 40 mol percent of another cationically polymerizable, cyclic ether or thioether in the presence of trifluoromethanesulfonic anhydride at temperatures from about −40° C. to +80° C. The reaction is performed in a polymerization system which is relatively free of—that is, which contains at most only minor amounts of—monoalkylatable chain-terminating agents, and it produces a polymer having a high degree of cationic activity at both ends of the polymer chain. Suitable cationically active, polymerizable, cyclic ether comonomers, which have from 2 to 6 ring carbon atoms and which introduce these atoms into the polyether chain, include oxacycloheptane, 3,3-bis-(chloromethyl) oxacyclobutane, phenyl glycidyl ether, propylene oxide, ethylene sulfide, epichlorohydrin, and 2-methyl tetrahydrofuran.

The polyether polyamines are then prepared by reacting the dicationically active polyethers with ammonia to add primary amino radicals to the cationically active terminal sites. From stoichiometric to excess amounts of ammonia are preferred in this reaction, and a temperature from about −100° C. to about +60° C. is generally suitable, although the lower temperatures in this range are generally preferred to moderate the rate of reaction. Solvents which are inert in an alkylation reaction, such as methylene chloride, trichlorofluoromethane and cyclohexane, may be employed. The resultant polyether polyamines useful in this invention generally range in molecular weight from 3500 to 30,000.

When the polyether polyamine has a molecular weight of about 3500, the epoxy resin and polyether polyamine should generally be included in useful liquid coating materials of this invention in proportions that provide a ratio of oxirane groups to amine groups of between 1 and 5. When the polyether polyamine has a molecular weight of about 5,000, a suitable ratio of epoxy resin to polyether polyamine is one that provides a ratio of oxirane groups to amine groups of between 1 and 8. Or, when the polyether polyamine has a molecular weight of about 10,000, a suitable ratio or epoxy resin to polyether polyamine is one that provides a ratio of oxirane groups to amine groups of between 1 and 12.

A catalyst may be included with the epoxy resin and polyether polyamine to accelerate the curing reaction. Suitable catalysts may be selected from tertiary amines, Lewis acids such as boron trifluoride diethyl etherate, or a wide variety of organo-metallic compounds such as stannous octoate (which should generally be used in rather low amounts to avoid staining of the facing) and dibutyltin dilaurate. A particularly useful catalyst system is a combination of 2,4,6-tris-(N,N-dimethyl ammonomethyl) phenol and stannous octoate, which are generally each used in an amount between 0.5–1 and 10 parts by weight per 100 parts of epoxy resin.

A coloring agent, generally a hinding-type coloring pigment, is almost always included in the tire sidewall coating material of this invention in an amount sufficient to color the material, usually in an amount between 10 and 100 parts per 100 parts of organic nonvolatile materials. As an alternative, pigment may be dusted on the surface of an applied layer of still-wet coating material, but with less satisfactory results. In some cases, an applied layer that is colored by a pigment dispersed in the layer is also dusted with a pigment to obtain special texturing; for example, clusters of pigment powder particles bonded together by an organic or inorganic binder of the type taught in Nellesen, U.S. Pat. 3,251,704, have been applied as a monolayer on an applied layer of liquid coating material of the invention with satisfactory results. Pigment may be included in the coating material supplied to a user, or a standard uncolored coating material may be supplied the user along with a variety of differently colored pigments. Also, reflex-reflective elements, such as transparent glass beads, may be dropped on an applied layer of the coating material to form tires that reflect light and provide night-time conspicuity.

As previously indicated, the coating material may be supplied in kit form for home-application by car owners or for use at tire retailers, or can be supplied in large batches for use in factories or by large tire retailers. Since the epoxy resin and polyether polyamine are rather active with one another at room temperature in the presently preferred systems, they should be kept in two parts until immediately prior to application. In one suitable kit, the coating material of this invention is divided into two parts and stored in separate pouches of a bag formed from overlapped plastic film. The bag may be formed so that the pouches are adjacent and separated only by a seal of the bag walls; at the time of use, the user breaks the seal by pulling the bag walls apart, and then mixes the two parts. For use in coating a five-tire set, such kits generally include enough ingredients to make between 75–100 and 250 grams of coating material.

A variety of application equipment may be used and the coating material may be applied in a variety of viscosities. The material may be extruded into the recess and allowed to flow out by itself; or it may be deposited in the layer and spread out, as with a squeegee-type tool; or a diluted solution may be sprayed in the recess; or the material may be simply brushed on. While a smooth-surfaced facing of this invention is quite attractive, the appearance of present tire sidewall facings is more closely duplicated by roughening the surface of facings of this invention in some way. Beside dropping pigment clusters on a still-wet applied layer of coating material, powders such as talc may be dusted on the surface of the still-wet layer, and then brushed off when the facing is dry.

In order to obtain good durability, the coating material should be applied to have a dry thickness of at least 2 mils, but generally it is not applied to a dry thickness of more than about 100 mils, and preferably not more than 60 or 70 mils so as to avoid any danger of solvent-blistering and any problems associated with adhesion to the tire of a rather thick layer of a material that may have an elastic modulus different from that of the tire. Preferably the surface of the tire sidewall that is staining ingredients, such as staining anti-oxidants, sulfur-stablized rubbers, or free sulfurs, which cause the colored sidewall to darken upon aging. If a mold-release agent is still present on the tire sidewall, that should be cleaned off with a cleaning agent such as toluene. While the liquid coating material of the invention will cure when left for 24 hours at room temperature, the material is most desirably heated for 30–60 minutes to 150°–250° F., as by heat lamps or with a heat gun, to cure the material adequately so that the tire can be placed on a car.

The invention is further illustrated by the following example:

| | Parts by weight |
|---|---|
| A 50 weight-percent-solids solution in toluene of poly(tetramethylene-oxide) diamine that has a molecular weight of 10,000 (number-average), an amine equivalent weight of 4610, and a viscosity at 65° C. of 49,500 centipoises, and that was prepared according to the procedures of Examples 1–4 of the above Hubin et al. patent | 200 |
| Titanium dioxide pigment (avg. diameter, 0.2 micron) | 40 |
| Chromium oxide yellow pigment (avg. diameter, 0.3 micron) | 4 |
| 2,4,6 - tris - dimethylaminomethyl phenol catalyst (DMP-30) | 2.5 |
| Diglycidyl ether of bisphenol A having an epoxide equivalent weight of 180–195 (Epon 828) | 50 |
| Stannous octoate catalyst | 5 |
| Toluene | 70 |

In one test, the above ingredients were simply mixed together and then applied over the ⅝-inch-wide white sidewall portions of some commercially produced tires. The original white sidewalls on the tires were first cleaned with a commercial powdered cleanser and then wiped with toluene. A spatula was used to apply the coating material over the sruface of the sidewalls, which were recessed about 1/16 inch below the adjacent portions of the tire, and then a thin razor blade was used to scrape the material and spread it out over the whole recessed original sidewall surface. Any liquid material outside the recess was wiped away with a toluene-soaked rag. On one of the tires, fluorocarbon-sized, spheroidal, 2- to 70-micron-diameter clusters of yellow pigment particles bound together with a silicate binder were dusted on the surface of the applied coating material. The tires were allowed to dry and cure for 24 hours at room temperature before being placed on an automobile. The dry thickness of the layer ranged from 10 to 40 mils and averaged 20 mils. The automobile was driven 16,000 miles and was washed 10 times in car washes where the tires were cleaned with tire scrubbers, and the colored sidewall portion on all the tires showed no signs of deterioration or staining.

We claim:
1. A method for forming a facing on a tire sidewall comprising:
   (A) applying in a recess in the tire sidewall a thin layer of liquid coating material that cures to a tough elastomeric condition and that comprises
      (1) an epoxy resin having on the average more than one oxirane group per molecule; and
      (2) a polyether polyamine that has a molecular weight of at least 3500 and that comprises a primary amino terminal group attached directly to each end of a polyether moiety that contains recurring groups, of which at least a majority are oxytetramethylene recurring units and at most a minority are recurring units of thioalkylene or another oxyalkylene having from 2 to 6 straight-chain carbon atoms, said polyether moiety having less than about three weight-percent secondary amino nitrogen atoms and less than about 0.3 weight-percent tertiary amino nitrogen atoms, and at least half of said primary amino terminal groups having the structure $—OC_4H_8NH_2$; and
   (B) subjecting the tire to conditions sufficient to cure the layer of coating material and adhere it to the tire.
2. A method of claim 1 in which the liquid coating material contains a coloring agent dispersed in it.
3. A method of claim 1 in which coloring agent particles dusted on the surface of the layer of liquid coating material when the layer is still wet.
4. A method of claim 1 in which reflex-reflective elements are dusted on the surface of the layer of liquid coating material when the layer is still wet.
5. A method for forming a facing on a tire comprising:
   (A) applying to the exterior surface of the tire a thin layer of liquid coating material that cures to a tough elastomeric condition and that comprises:
      (1) an epoxy resin having on the average more than one oxirane group per molecule; and
      (2) a polyether polyamine that has a molecular weight of at least 3500 and that comprises a primary amino terminal group atached directly to each end of a polyether moiety that contains recurring groups, of which at least a majority are oxytetramethylene recurring units and at most a minority are recurring units of thioalkylene or another oxyalkylene having from 2 to 6 straight-chain carbon atoms, said polyether moiety having less than about three weight-percent secondary amino nitrogen atoms and less than about 0.3 weight-percent tertiary amino nitrogen atoms, and at least half of said primary amino terminal groups having the structure

$—OC_4H_8NH_2$ and
   (B) subjecting the tire to conditions sufficient to cure the layer of coating material and adhere it to the tire.

References Cited

UNITED STATES PATENTS 3,285,314  11/1966  Roberts _____ 156—116 X
3,365,345  1/1968   Cooper et al. _____ 152—353 X LELAND A. SEBASTIAN, Primary Examiner U.S. Cl. X.R.

117—8, 9, 18, 25, 37, 139; 152—353; 156—116

UNITED STATES PATENT OFFICE
CERTIFICATE OF CORRECTION

Patent No. 3,623,900  Dated Nov. 30, 1971

Inventor(s) Nelson Jonnes and Robert Huberty

It is certified that error appears in the above-identified patent and that said Letters Patent are hereby corrected as shown below:

The sentence beginning in column 4, line 37 should read, "Preferably the surface of the tire sidewall that is coated is a nonstaining elastomeric veneer--that is, is free of staining ingredients, such as staining anti-oxidants, sulfur-stabilized rubbers, or free sulfurs, which cause the colored sidewall to darken upon aging."

column 3, line 52, "hinding-type" should be --hiding-type--.

column 4, lines 3 and 4, "active" should be --reactive--.

Signed and sealed this 31st day of October 1972.

(SEAL)
Attest:

EDWARD M. FLETCHER, JR.
Attesting Officer

ROBERT GOTTSCHALK
Commissioner of Patents